United States Patent
Watanabe

(10) Patent No.: US 8,766,096 B2
(45) Date of Patent: Jul. 1, 2014

(54) PRODUCTION METHOD OF FOAMED ELECTRIC WIRE

(75) Inventor: Ryo Watanabe, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/240,412

(22) Filed: Sep. 22, 2011

(65) Prior Publication Data

US 2012/0010308 A1   Jan. 12, 2012

Related U.S. Application Data

(63) Continuation of application No. PCT/JP2009/001463, filed on Mar. 30, 2009.

(51) Int. Cl.
*H01B 13/14* (2006.01)
*H01B 13/00* (2006.01)
*H01B 3/30* (2006.01)
*C08J 9/00* (2006.01)

(52) U.S. Cl.
USPC .......................... 174/110 F; 521/81; 521/140

(58) Field of Classification Search
USPC .............................. 521/79, 81, 140; 174/110 F
See application file for complete search history.

(56) References Cited

U.S. PATENT DOCUMENTS 5,574,074 A * 11/1996 Zushi et al. .................. 521/143
7,091,277 B2 * 8/2006 Rydin et al. .................. 524/543

FOREIGN PATENT DOCUMENTS

| JP | 2-210722 A | 8/1990 | |
| JP | 9-95539 A | 4/1997 | |
| JP | 2000-235814 A | 8/2000 | |
| JP | 2003-026846 A | 1/2003 | |
| JP | 2005-078835 A | 3/2005 | |
| JP | 2006045268 A * | 2/2006 | C08J 9/12 |

OTHER PUBLICATIONS

Prime Polypro J704UG Data Sheet. 2012.*

* cited by examiner

*Primary Examiner* — Kara Boyle
(74) *Attorney, Agent, or Firm* — Sughrue Mion, PLLC

(57) ABSTRACT

The present invention discloses a production method of a foamed electric wire, whereby a foamed electric wire is obtained via a foamed insulation layer formation step of forming a foamed insulation layer on a conductor, wherein the foamed insulation layer formation step includes: a step of introducing a base resin into an extruding machine, a step of introducing a foaming agent into the extruding machine, and a step of extruding a mixture containing the base resin and the foaming agent from the extruding machine and forming the foamed insulation layer on the conductor, and wherein the resin contained in the mixture has a shear stress of 0.40 to 0.80 Mpa, and the base resin is a propylene-based resin.

5 Claims, 2 Drawing Sheets

PRODUCTION METHOD OF FOAMED ELECTRIC WIRE

CROSS REFERENCE TO RELATED APPLICATIONS

This application is a Continuation of National Stage of International Application No. PCT/JP2009/001463 filed Mar. 30, 2009, the contents of which are incorporated herein by reference in their entirety.

TECHNICAL FIELD

The present invention relates to a production method of a foamed electric wire.

BACKGROUND ART

The foamed insulation layers of foamed electric wires used in high-speed transmission cables such as USB 3.0 cables, HDMI cables, InfiniBand cables or micro USB cables are required to have a narrow diameter, have high heat resistance and enable the formation of fine foam.

Although polyethylene (PE), which demonstrates superior electrical characteristics at high frequencies, has typically been conventionally used for the insulating material that composes the foamed insulation layer, PE does not allow the formation of adequately fine foam in addition to being unable to satisfy the requirement of an upper limit of heat resistance of about 90° C. as required for the high-frequency cables described above. Consequently, it has been proposed to obtain a foamed insulation layer having superior heat resistance and foamability by using a propylene-based resin having prescribed characteristics (Patent Document 1).

Patent Document 1: Japanese Patent Application Laid-open No. 2005-78835

DISCLOSURE OF THE INVENTION

Problems to be Solved by the Invention

However, even though the propylene-based resin of the above-mentioned Patent Document 1 forms a foamed insulation layer by introducing a foaming agent, the diameter of the foamed body in the foamed insulation layer is still large, thereby leaving room for improvement with respect to the formation of fine foam. In addition, in the case of attempting to extrusion-mold a narrow-diameter foamed insulation layer on a conductor at high speed with an extruding machine, the resin pressure in the head of the extruding machine becomes extremely high, and as a result thereof, the resin pressure ends up exceeding the allowed resin pressure of the head. Consequently, in the case of producing a foamed insulation layer using the propylene-based resin of Patent Document 1, there was no choice but to reduce linear velocity, thereby leaving room for improvement with respect to the production efficiency of foamed electric wires.

With the foregoing in view, an object of the present invention is to provide a production method of a foamed electric wire capable of adequately improving production efficiency of foamed electric wires while enabling the formation of fine foam in a foamed insulation layer.

Means for Solving the Problems

As a result of conducting extensive studies to solve the aforementioned problems, the inventors of the present invention found there to be an intimate relationship between shear stress of the resin contained in an extruding machine and resin pressure in the head of the extruding machine in the case of using a propylene-based resin as a base resin, and that by setting the shear stress to be within a prescribed range, resin pressure in the head of the extruding machine can be significantly reduced while still enabling the formation of fine foam, thereby leading to completion of the present invention.

Namely, the present invention is a production method of a foamed electric wire, whereby a foamed electric wire is obtained via a foamed insulation layer formation step of forming a foamed insulation layer on a conductor, wherein the foamed insulation layer formation step includes: a step of introducing a base resin into an extruding machine, a step of introducing a foaming agent into the extruding machine, and a step of extruding a mixture containing the base resin and the foaming agent from the extruding machine and forming the foamed insulation layer on the conductor, and wherein the resin contained in the mixture has a shear stress of 0.40 to 0.80 MPa, and the base resin is a propylene-based resin.

According to this production method, it is possible to form fine foam in a foamed insulation layer formed on a conductor. In addition, resin pressure in the head of an extruding machine can be reduced, linear velocity of the conductor can be increased, and the production efficiency of foamed electric wires can be adequately improved.

In the above-mentioned production method, the melt tension at break of the resin contained in the mixture is preferably 15 mN or more.

In this case, fine foam can be formed more easily in comparison with the case of the melt tension at break of the resin contained in the mixture being less than 15 mN.

In the above-mentioned production method, the propylene-based resin is preferably an ethylene-propylene-based copolymer.

In this case, fine foam can be formed more easily.

Furthermore, in the present invention, "shear stress" refers to shear stress measured using a capillary rheometer (Capillograph 1D, Toyo Seiki Seisaku-sho, Ltd.), and more specifically, refers to that obtained by filling a resin into a flat capillary having an inner diameter of 0.4 mm and length of 2 mm, placing the filled capillary in a capillary rheometer, and setting the capillary rheometer to measuring conditions consisting of a piston speed of 30 mm/min, barrel diameter of 9.55 mm and temperature of the barrel and capillary of 200° C. each, followed by filling the resin into the barrel and measuring the resulting value after preheating for 10 minutes. Furthermore, the resin filled into the flat capillary or barrel refers to a mixed resin of a base resin and a resin contained in a master batch in the case of introducing a foaming agent with it contained in the master batch into the extruding machine together with the base resin, or the base resin in the case of introducing a foaming agent without containing a foaming agent in the master batch into the extruding machine together with the base resin.

In addition, in the present invention, "melt tension" refers to melt tension measured using a capillary rheometer (Capillograph 1D, Toyo Seiki Seisaku-sho, Ltd.), and more specifically, refers to that obtained by filling a resin into a flat capillary having an inner diameter of 1 mm and length of 10 mm, setting the capillary rheometer to measuring conditions consisting of a piston speed of 5 mm/min, barrel diameter of 9.55 mm, extracting acceleration of 400 m/min, and temperatures of the barrel, the capillary and the thermostatic bath immediately after the barrel of 200° C. each, followed by filling the resin into the barrel, starting piston extrusion at the above-mentioned piston speed after preheating for 5 minutes, extracting by accelerating at the above-mentioned extracting acceleration, measuring the tension at the time of breakage, and determining the average value of the measured values of tension obtained by repeating measurement 10 times. Furthermore, the resin filled into the flat capillary or barrel refers to a mixed resin of a base resin and a resin contained in a master batch in the case of introducing a foaming agent with it contained in the master batch into the extruding machine together with the base resin, or the base resin in the case of introducing a foaming agent without containing the foaming agent in the master batch into the extruding machine together with the base resin.

Effects of the Invention

According to the present invention, a production method of a foamed electric wire is provided that enables adequate improvement of production efficiency of foamed electric wires while enabling the formation of fine foam in a foamed insulation layer.

EXPLANATION OF REFERENCE NUMERALS

1 Internal conductor (conductor), 2 Foamed insulation layer, 5 Foamed electric wire

BEST MODE FOR CARRYING OUT THE INVENTION

Figure 1:
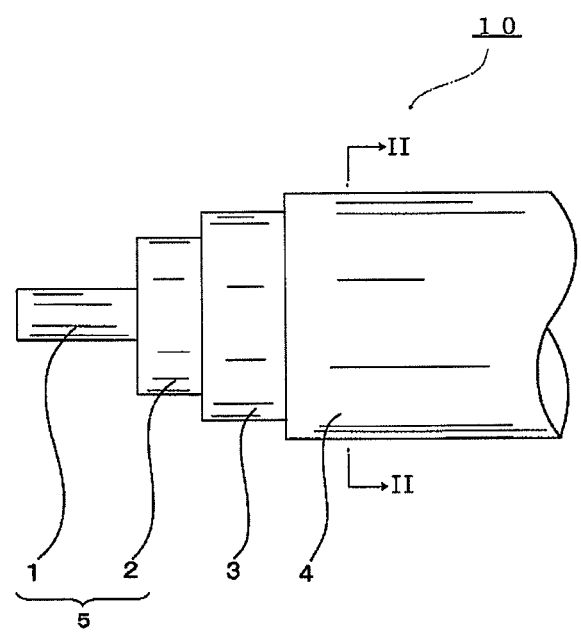
FIG. 1 is a partial cross-sectional side view showing an embodiment of a foamed electric wire of the present invention.

The following provides a detailed explanation of embodiments of the present invention using FIG. 1.

Figure 2:
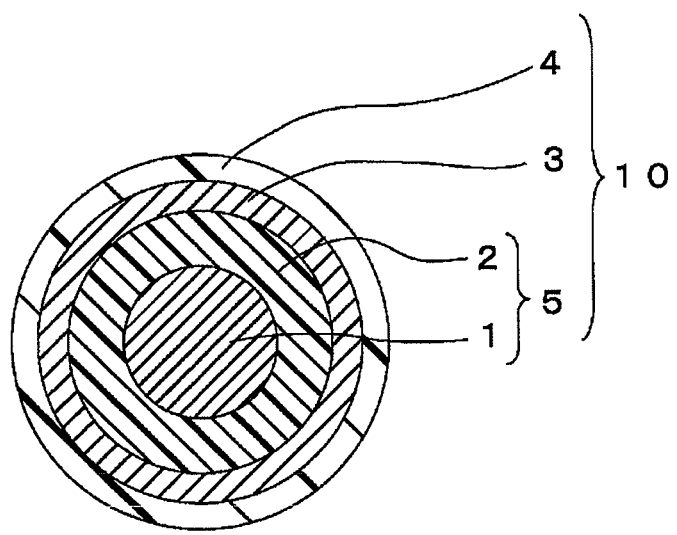
FIG. 2 is a cross-sectional view taken along line II-II in FIG. 1.

FIG. 1 is a partial side view showing an embodiment of the foamed electric wire according to the present invention, while FIG. 2 is a cross-sectional view taken along line II-II in FIG. 1. As shown in FIG. 1, a cable 10 indicates a coaxial cable, and is provided with an internal conductor 1, a foamed insulation layer 2 covering the internal conductor 1, an external conductor 3 surrounding the foamed insulation layer 2, and a sheath 4 that covers the external conductor 3. Here, a foamed electric wire 5 is composed by the internal conductor 1 and the foamed insulation layer 2.

Examples of the internal conductor 1 covered by the foamed insulation layer 2 include metal wires such as a copper wire, copper alloy wire or aluminum wire. In addition, a metal wire plated with tin or silver and the like over the metal wire can also be used for the internal conductor 1. In addition, a single wire or twisted wire can be used for the internal conductor 1.

A known conventionally used external conductor can be used for the external conductor 3 covering the foamed insulation layer 2. For example, the external conductor 3 can be formed by wrapping a tape composed by interposing a conductive wire or conductive sheet between resin sheets along the outer periphery of the insulation layer 2. In addition, the external conductor 3 can also be composed with a corrugated metal tube, or in other words, a metal tube formed to have a wavy shape. In this case, the bendability of the cable 10 can be improved.

The sheath 4 protects the external conductor 3 from physical or chemical damage, and although examples of the material that composes the sheath 4 include a resin such as fluorine resin and polyethylene, fluorine resin is used preferably from the viewpoints of heat resistance and dielectric characteristics.

The cable 10 can be obtained by producing the foamed electric wire 5 by forming the foamed insulation layer 2 on the internal conductor 1 followed by surrounding the foamed electric wire 5 with the external conductor 3 and finally covering the external conductor 3 with the sheath 4.

(Foamed Electric Wire Production Method)

The following provides an explanation of a production method of the foamed electric wire 5.

The foamed insulation layer 2 is formed via a step of introducing a base resin into an extruding machine, a step of introducing a foaming agent into the extruding machine, and a step of forming the foamed insulation layer 2 on the internal conductor 1 by extruding a mixture containing the base resin and the foaming agent from the extruding machine. Here, the resin contained in the mixture is the base resin, and a propylene-based resin having a shear stress of 0.40 to 0.80 MPa is used for the base resin.

When the foamed electric wire 5 is produced in the manner described above, fine form can be formed in the foamed insulation layer 2. In addition, the resin pressure in the head of the extruding machine can be lowered, the linear velocity of the internal conductor 1 can be increased, and the production efficiency of the foamed electric wire 10 can be adequately improved.

A propylene-based resin having a shear stress of 0.4 to 0.8 MPa is used for the base resin introduced into the extruding machine. If the shear stress of the propylene-based resin that composes the base resin is less than 0.4 MPa, in the case of extrusion molding a mixture containing the base resin and foaming agent from the extruding machine, although the resin pressure in the head of the extruding machine can be reduced, it becomes difficult to form fine foam in the foamed insulation layer 2. Conversely, if the shear stress exceeds 0.8 MPa, in the case of extrusion molding a mixture containing the base resin and foaming agent from the extruding machine, although fine foam can be formed in the foamed insulation layer 2, the resin pressure in the head of the extruding machine becomes remarkably high.

The base resin can be obtained by, for example, initially melting pellets of a propylene-based resin (to be referred to as the "raw material propylene-based resin") and then reforming into pellets. More specifically, the base resin can be obtained by introducing the raw material propylene-based resin into a heated extruding machine in which the resin temperature is 200° C. to less than 270° C., and preferably 220 to 260° C., and cutting the product extruded from a die in the form of a string with a pelletizer. If the temperature is lower than 200° C., there is hardly any change in the molecular structure of the propylene-based resin, and resin pressure cannot be reduced. On the other hand, if the temperature is 270° C. or higher, deterioration of the raw material propylene-based resin becomes severe and the life of the base resin is shortened. Shear stress can be adjusted by suitably changing the temperature within a temperature range of 200° C. to less than 270° C. Any extruding machine may be used for the extruding machine provided it is able to apply heat to the propylene-based resin.

Although there are no particular limitations on the propylene-based resin provided it is a propylene-based resin, specific examples of propylene-based resins that can be used include FB3312 (Japan Polypropylene Corp.), FB5100 (Japan Polypropylene Corp.), J704UG (Prime Polymer Co., Ltd.) and VP103 (Grand Polymer Co., Ltd.).

The propylene-based resin that composes the base resin refers to that having a constitutional unit derived from propylene, and examples of such propylene-based resins include propylene homopolymers and copolymers of propylene and an olefin other than propylene. Examples of olefins other than propylene include ethylene, butene and hexene. In particular, ethylene-propylene copolymers are used preferably from the viewpoints of fine foaming and heat resistance.

The melt tension at break of the propylene-based resin that composes the base resin is preferably 15 mN or more, and more preferably 20 mN or more, since this facilitates the formation of fine foam. However, if the melt tension is excessively large, since the degree of foaming during extrusion of the mixture containing the base resin and foaming agent tends to become low, the melt tension is preferably 45 mN or less and more preferably 30 mN or less.

The melt tension of the base resin can be adjusted by, for example, adjusting the temperature of the resin at the die outlet of the extruding machine.

A chemical foaming agent or gas foaming agent is used for the foaming agent, and although a chemical foaming agent and gas foaming agent can be respectively used independently for the foaming agent, a chemical foaming agent and a gas foaming agent can also be used in combination.

A chemical foaming agent is that which generates $NH_3$, $N_2$ or $CO_2$ gas and the like as a result of thermal decomposition, and examples include azodicarbonamide, 4,4'-oxybisbenzenesulfonyl hydrazide, N,N'-dinitrosopentamethylene tetramine and azobisisobutyronitrile.

Examples of gas foaming agents include hydrocarbons such as propane, butane, pentane, pentene, hexane, hexene, heptane or octene, and inert gases such as nitrogen, argon, helium or carbon dioxide gas.

The step of introducing the foaming agent into the extruding machine may be that in which the foaming agent is introduced independently, in other words, in a state in which it is not contained in a master batch resin into the extruding machine with the base resin, or that in which the foaming agent is independently introduced into the extruding machine at a location downstream from the location where the base resin is introduced. Alternatively, the step of introducing the foaming agent into the extruding machine may include a step of independently introducing the foaming agent into the extruding machine with the base resin, and a step of independently introducing the foaming agent into the extruding machine at location downstream from the location where the base resin is introduced. Furthermore, a single screw extruding machine or twin screw extruding machine can be used for the extruding machine.

Kneading of the mixture containing the base resin and the foaming agent is normally carried out for 2 to 10 minutes at a temperature at which the base resin melts such as 170 to 200° C. Here, kneading is preferably carried out at a temperature lower than the temperature when melt-molding the base resin.

Furthermore, in the case the foaming agent is a chemical foaming agent, the mean particle diameter of pellets of the base resin is 0.5 to 3 mm and preferably 0.8 to 1.3 mm, the particle size distribution of the foaming agent preferably has a sharp particle size distribution, and the mean particle diameter of the chemical foaming agent is preferably 3 to 10 μm. In this case, the foaming agent is uniformly dispersed in the base resin in the case of kneading the base resin and the foaming agent, and as a result, fluctuations in outer diameter of the resulting foamed insulation layer 2 can be adequately suppressed. This is particularly useful in the case the foamed insulation layer 2 of the foamed electric wire 5 has a narrow diameter of 0.16 mm or less.

The extrusion linear velocity of the mixture containing the base resin and the foaming agent is normally 150 to 1000 m/min and preferably 300 to 500 m/min.

In the case the foamed electric wire 10 is used as a high-frequency cable, the outer diameter of the foamed insulation layer 2 is preferably 1.6 mm or less and more preferably 1.0 mm or less.

Furthermore, the present invention is not limited to the above-mentioned embodiment. For example, although the foaming agent is independently introduced into the extruding machine with the base resin in the previously described embodiment, the foaming agent may also be introduced into the extruding machine with the base resin in a state in which the foaming agent is contained in master batch pellets.

In this case, the mixture in the extruding machine contains the foaming agent, the base resin and a master batch resin contained in the master batch pellets, and the resin contained in the mixture is a mixed resin of the base resin and the master batch resin. Thus, in this case, the mixed resin is required to have a shear stress of 0.40 to 0.80 MPa. Here, the master batch resin is introduced into the extruding machine at a ratio of 0.05 to 0.15 based on a value of 100 for the total mass of the master batch resin and the base resin. Namely, the ratio of the master batch resin is sufficiently small in comparison with the base resin. Consequently, in order to make the shear stress of the mixed resin 0.40 to 0.80 MPa, the shear stress of the base resin is 0.40 to 0.80 MPa as previously described.

Polypropylene or polyethylene (and preferably, low-density polyethylene) is used for the resin contained in the master batch pellets. This is because these resins are compatible with the base resin and can be kneaded at a temperature equal to or lower than the foaming start temperature. In addition, the concentration of the foaming agent in the master batch pellets is normally 5 to 20% by mass.

Moreover, in the case of using a chemical foaming agent for the foaming agent, the mean particle diameter of the master batch pellets is preferably nearly equal to the mean particle diameter of the pellets of the base resin. Here, in the case of kneading the base resin pellets with the master batch, the foaming agent is uniformly dispersed in the base resin and as a result, fluctuations in outer diameter of the resulting foamed insulation layer 2 can be adequately suppressed. This is particularly useful in the case the foamed insulation layer 2 of the foamed electric wire 5 has a narrow diameter of 0.16 mm or less. At this time, a mean particle diameter of the master batch pellets and the base resin pellets of 0.8 to 1.3 mm is more effective for suppressing fluctuations in outer diameter.

In addition, although an example of applying the foamed electric wire 5 to a coaxial cable is indicated in the previously described embodiment, the foamed electric cable 5 can also be applied to high-speed transmission cables such as USB 3.0 cables, HDMI cables, InfiniBand cables or micro USB cables.

EXAMPLES

Although the following provides a more specific explanation of the contents of the present invention by listing examples and comparative examples, the present invention is not limited to the following examples.

Example 1

Raw material pellets composed of an ethylene-propylene copolymer (FB3312, Japan Polypropylene Corp.) were prepared followed by melt-molding these raw material pellets at 250° C. and then reforming into pellets to obtain base resin pellets having the shear stress and melt tension shown in Table 1 (to be referred to as "base resin pellets").

Next, 0.05 parts by mass of azodicarbonamide (ADCA) as foaming nucleating agent were added to 100 parts by mass of the base resin pellets obtained in the manner described above, the two components were mixed, and the mixture was introduced into an extruding machine (screw diameter (D): φ25 mm, effective screw length (L): 800 mm, Hijiri Manufacturing Ltd.). In addition, nitrogen gas as foaming agent was injected into the extruding machine at a location farther downstream than the location where the base resin pellets were introduced. The mixture of base resin pellets and nitrogen gas was then kneaded under conditions of a kneading temperature of 190° C. and screw speed of 50 to 100 rpm.

A foamed insulation layer having an outer diameter of 0.9 mm and a thickness of 30 μm was extruded from the crosshead of the extruding machine at a linear velocity of 200 m/min as shown in Table 1, and coated onto a conductor composed of tin-plated copper so as to cover the conductor. A foamed electric wire was produced in this manner.

Example 2

A foamed electric wire was produced in the same manner as Example 1 with the exception of not introducing nitrogen gas into the extruding machine and introducing ADCA at a ratio of 0.6 parts by mass to 100 parts by mass of the base resin pellets.

Example 3

A foamed electric wire was produced in the same manner as Example 2 with the exception of melt-molding the raw material pellets at the temperature shown in Table 1 and reforming into pellets to obtain base resin pellets having the shear stress and melt tension shown in Table 1, and introducing these base resin pellets into the extruding machine along with ADCA.

Example 4

A foamed electric wire was produced in the same manner as Example 2 with the exception of melt-molding the raw material pellets at the temperature shown in Table 1 and reforming into pellets to obtain base resin pellets having the shear stress and melt tension shown in Table 1, and introducing these base resin pellets into the extruding machine along with ADCA.

Example 5

A foamed electric wire was produced in the same manner as Example 2 with the exception of melt-molding the raw material pellets at the temperature shown in Table 1 and reforming into pellets to obtain base resin pellets having the shear stress and melt tension shown in Table 1, and introducing these base resin pellets into the extruding machine along with ADCA.

Example 6

A foamed electric wire was produced in the same manner as Example 2 with the exception of using raw material pellets composed of an ethylene-propylene copolymer (FB5100, Japan Polypropylene Corp.) for the raw material pellets, melt-molding these raw material pellets at the temperature shown in Table 1 and reforming into pellets to obtain base resin pellets having the shear stress and melt tension shown in Table 1, and introducing these base resin pellets into the extruding machine along with ADCA.

Example 7

A foamed electric wire was produced in the same manner as Example 2 with the exception of using raw material pellets composed of homopolypropylene (VP103, Grand Polymer Co., Ltd.) for the raw material pellets, melt-molding these raw material pellets at the temperature shown in Table 1 and reforming into pellets to obtain base resin pellets having the shear stress and melt tension shown in Table 1, and introducing these base resin pellets into the extruding machine along with ADCA.

Example 8

A foamed electric wire was produced in the same manner as Example 2 with the exception of changing the extrusion linear velocity of the foamed insulation layer to 300 m/min.

Example 9

A foamed electric wire was produced in the same manner as Example 2 with the exception of changing the extrusion linear velocity of the foamed insulation layer to 500 m/min.

Example 10

A foamed electric wire was produced in the same manner as Example 2 with the exception of changing the extrusion linear velocity of the foamed insulation layer to 150 m/min.

Example 11

A foamed electric wire was produced in the same manner as Example 2 with the exception of changing the outer diameter of the foamed insulation layer to 1.6 mm and the thickness to 0.5 mm.

Example 12

A foamed electric wire was produced in the same manner as Example 2 with the exception of changing the outer diameter of the foamed insulation layer to 0.7 mm and the thickness to 0.2 mm.

Example 13

A foamed electric wire was produced in the same manner as Example 2 with the exception of changing the outer diameter of the foamed insulation layer to 0.5 mm and the thickness to 0.15 mm.

Comparative Example 1

A foamed electric wire was produced in the same manner as Example 1 with the exception of using raw material pellets composed of polyethylene (Hizex 5305E, Mitsui Chemicals, Inc.) for the raw material pellets, and introducing the raw material pellets into the extruding machine along with ADCA without melt-molding the raw material pellets.

Comparative Example 2

A foamed electric wire was produced in the same manner as Example 2 with the exception of using raw material pellets composed of polyethylene (Hizex 5305E, Mitsui Chemicals, Inc.) for the raw material pellets, and introducing the raw material pellets into the extruding machine along with ADCA without melt-molding the raw material pellets.

Comparative Example 3

A foamed electric wire was produced in the same manner as Example 2 with the exception of introducing the raw material pellets into the extruding machine along with ADCA without melt-molding the raw material pellets.

Comparative Example 4

A foamed electric wire was produced in the same manner as Example 2 with the exception of melt-molding the raw material pellets at the temperature shown in Table 1 and reforming into pellets to obtain base resin pellets having the shear stress and melt tension shown in Table 1.

Comparative Example 5

A foamed electric wire was produced in the same manner as Example 2 with the exception of melt-molding the raw material pellets at the temperature shown in Table 1 and reforming into pellets to obtain base resin pellets having the shear stress and melt tension shown in Table 1.

Comparative Example 6

A foamed electric wire was produced in the same manner as Example 1 with the exception of using raw material pellets composed of an ethylene-propylene copolymer (J704UG, Prime Polymer Co., Ltd.) for the raw material pellets, melt-molding these raw material pellets at the temperature shown in Table 1 and reforming into pellets to obtain base resin pellets having the shear stress and melt tension shown in Table 1.

Comparative Example 7

A foamed electric wire was produced in the same manner as Example 2 with the exception of using raw material pellets composed of an ethylene-propylene copolymer (FB5100, Japan Polypropylene Corporation) for the raw material pellets, introducing these raw material pellets directly into the extruding machine along with ADCA without melt-molding the raw material pellets, and changing the extrusion linear velocity to 150 m/min.

Comparative Example 8

A foamed electric wire was produced in the same manner as Example 2 with the exception of using raw material pellets composed of homopolypropylene (VP103, Grand Polymer Co., Ltd.) for the raw material pellets, introducing these raw material pellets directly into the extruding machine along with ADCA without melt-molding the raw material pellets, and changing the extrusion linear velocity to 150 m/min.

[Evaluation of Properties]

The following properties were evaluated for the foamed electric wires obtained in Examples 1 to 13 and Comparative Examples 1 to 8.

(1) Head Resin Pressure

Resin pressure in the crosshead during extrusion molding was measured with a resin pressure gauge. The results are shown in Table 1. Furthermore, resin pressure of less than 50 MPa was evaluated as acceptable, while that of 50 MPa or more was evaluated as unacceptable.

(2) Mean Foam Cell Diameter

A portion of the foamed insulation layer was cut from the foamed electric wires, a cross-section of the foamed insulation layer was observed using a scanning electron microscope, and cell diameter was measured based on the following equation for each of 100 randomly selected foam cells.

$$\text{Cell diameter} = (\text{max. cell diameter} + \text{min. cell diameter})/2$$

The mean value of the cell diameters of 100 foam cells was calculated as "mean foam cell diameter". The results are shown in Table 1. Furthermore, the scores of 1 to 6 in Table 1 have the meanings indicated below, a score of 1 to 3 was evaluated as acceptable, while a score of 4 to 6 was evaluated as unacceptable.

1: 10 µm to less than 30 µm

2: 30 µm to less than 40 µm

3: 40 µm to less than 50 µm

4: 50 µm to less than 70 µm

5: 70 µm to less than 100 µm

6: 100 µm or more (3) Heat Resistance

Heat resistance was evaluated by carrying out a heat deformation test. The heat deformation test was carried out by using a heat deformation tester manufactured by Toyo Seiki Seisaku-sho, Ltd., placing the foamed insulation layer on a cylindrical jig having a diameter of 9 mm and preheating for 1 hour, applying a load of 250 g so as to press the foamed insulation layer onto the cylindrical jig, and measuring the deformation rate until 1 hour had elapsed. The results are shown in Table 1. Furthermore, the meaning of the symbols "○" and "×" in Table 1 are as indicated below, with "○" indicating superior heat resistance of the foamed insulation layer evaluated as acceptable, and "×" indicating inferior heat resistance of the foamed insulation layer evaluated as unacceptable.

○: Deformation rate of less than 50%

×: Deformation rate of 50% or more (4) Degree of Foaming

Degree of foaming was calculated based on the equation below.

$$\text{Degree of foaming}(\%) = [1 - (\text{specific gravity of foamed Insulation layer after foaming/specific gravity of base resin pellets or raw material pellets before foaming})] \times 100$$

As a result, the degree of foaming in the foamed insulation layers of all of the foamed electric wires obtained in Examples 1 to 13 and Comparative Examples 1 to 8 was 40%.

TABLE 1

|  | Base Resin | Melt molding ° C. | Foaming agent | Shear stress MPa | Melt tension mN | Insulation layer outer diameter mm | Extrusion linear velocity m/min | Resin pressure MPa | Mean foam cell diameter — | Heat resistance — |
|---|---|---|---|---|---|---|---|---|---|---|
| Ex. 1 | Ethylene-propylene copolymer*1 | 250 | N₂ gas | 0.5 | 21 | 0.9 | 200 | 20 | 3 | ○ |
| Ex. 2 | Ethylene-propylene copolymer*1 | 250 | ADCA | 0.5 | 21 | 0.9 | 200 | 20 | 2 | ○ |
| Ex. 3 | Ethylene-propylene copolymer*1 | 240 | ADCA | 0.62 | 28 | 0.9 | 200 | 30 | 2 | ○ |
| Ex. 4 | Ethylene-propylene copolymer*1 | 230 | ADCA | 0.74 | 44 | 0.9 | 200 | 45 | 1 | ○ |
| Ex. 5 | Ethylene-propylene copolymer*1 | 260 | ADCA | 0.46 | 16 | 0.9 | 200 | 17 | 3 | ○ |
| Ex. 6 | Ethylene-propylene copolymer*2 | 250 | ADCA | 0.75 | 40 | 0.9 | 200 | 40 | 1 | ○ |
| Ex. 7 | Homopolypropylene*3 | 250 | ADCA | 0.79 | 40 | 0.9 | 200 | 48 | 1 | ○ |
| Ex. 8 | Ethylene-propylene copolymer*1 | 250 | ADCA | 0.5 | 21 | 0.9 | 300 | 25 | 2 | ○ |
| Ex. 9 | Ethylene-propylene copolymer*1 | 250 | ADCA | 0.5 | 21 | 0.9 | 500 | 30 | 2 | ○ |
| Ex. 10 | Ethylene-propylene copolymer*1 | 250 | ADCA | 0.5 | 21 | 0.9 | 150 | 15 | 2 | ○ |
| Ex. 11 | Ethylene-propylene copolymer*1 | 250 | ADCA | 0.5 | 21 | 1.6 | 200 | 20 | 2 | ○ |
| Ex. 12 | Ethylene-propylene copolymer*1 | 250 | ADCA | 0.5 | 21 | 0.7 | 200 | 20 | 2 | ○ |
| Ex. 13 | Ethylene-propylene copolymer*1 | 250 | ADCA | 0.5 | 21 | 0.5 | 200 | 20 | 2 | ○ |
| Comp. Ex. 1 | Polyethylene | — | N₂ gas | 0.63 | 19 | 0.9 | 200 | 30 | 5 | x |
| Comp. Ex. 2 | Polyethylene | — | ADCA | 0.63 | 19 | 0.9 | 200 | 30 | 3 | x |
| Comp. Ex. 3 | Ethylene-propylene copolymer*1 | — | ADCA | 1.1 | 49 | 0.9 | 200 | 60 | 1 | ○ |
| Comp. Ex. 4 | Ethylene-propylene copolymer*1 | 220 | ADCA | 0.83 | 46 | 0.9 | 200 | 50 | 1 | ○ |
| Comp. Ex. 5 | Ethylene-propylene copolymer*1 | 270 | ADCA | 0.39 | 11 | 0.9 | 200 | 15 | 4 | ○ |
| Comp. Ex. 6 | Ethylene-propylene copolymer*4 | 250 | N₂ gas | 0.38 | 5 | 0.9 | 200 | 20 | 6 | ○ |
| Comp. Ex. 7 | Ethylene-propylene copolymer*2 | — | ADCA | 1.3 | 55 | 0.9 | 150 | 75 | 1 | ○ |
| Comp. Ex. 8 | Homopolypropylene*3 | — | ADCA | 1.3 | 50 | 0.9 | 150 | 75 | 1 | ○ |

*1 to *4 respectively indicate the use of FB3312 (Japan Polypropylene Corp.), FB5100 (Japan Polypropylene Corp.), VP103 (Grand Polymer Co., Ltd.) and J704UG (Prime Polymer Co., Ltd.) for the raw material polypropylene-based resin.

According to the results of Table 1, the foamed electric wires of Examples 1 to 13 allowed the formation of fine foam in the foamed insulation layer and were determined to adequately reduce resin pressure in comparison with the foamed electric wires of Comparative Examples 1 to 8. With reference to Examples 8 and 9 in particular, resin pressure was only 25 MPa despite having increased the extrusion linear velocity to 300 m/min, and resin pressure was only 30 MPa despite having further increased the extrusion linear velocity to 500 m/min, still leaving ample leeway to the allowed head resin pressure. This indicates that there is room for further increasing the extrusion linear velocity.

On the basis of the above, according to the foamed electric wire production method of the present invention, the production efficiency of foamed electric wires was confirmed to be able to be adequately improved while enabling the formation of fine foam in a foamed insulation layer.

The invention claimed is:

1. A production method of a foamed electric wire, whereby a foamed electric wire is obtained via a foamed insulation layer formation step of forming a foamed insulation layer on a conductor, wherein
the foamed insulation layer formation step includes:
a step of heating pellets of a raw material propylene-based resin at a temperature of 200° C. to less than 270° C. to form a melt;
a step of, after forming the melt and before mixing with a foaming agent, reforming pellets from the melt to produce base resin pellets having a shear stress of 0.40 to 0.80 MPa,
a step of introducing the base resin pellets into an extruding machine,
a step of introducing the foaming agent into the extruding machine,
a step of kneading a mixture containing the base resin pellets and the foaming agent, and
a step of extruding the mixture from the extruding machine and forming the foamed insulation layer on the conductor.

2. The production method of a foamed electric wire according to claim 1, wherein the propylene-based resin is an ethylene-propylene-based copolymer.

3. The production method of a foamed electric wire according to claim 1, wherein the melt tension at break of the resin contained in the mixture is 15 mN or more.

4. The production method of a foamed electric wire according to claim 1, wherein the mixture containing the base resin pellets and the foaming agent is kneaded at a temperature of 170 to 200° C. before extruding the mixture from the extruding machine.

5. The production method of a foamed electric wire according to claim 3, wherein the propylene-based resin is an ethylene-propylene-based copolymer.

* * * * *